T. J. RITTER, Jr., AND B. M. WARN.
LEVER HOLDING MECHANISM FOR AUTOMOBILES.
APPLICATION FILED AUG. 6, 1919.
1,329,142.
Patented Jan. 27, 1920.
2 SHEETS—SHEET 1.
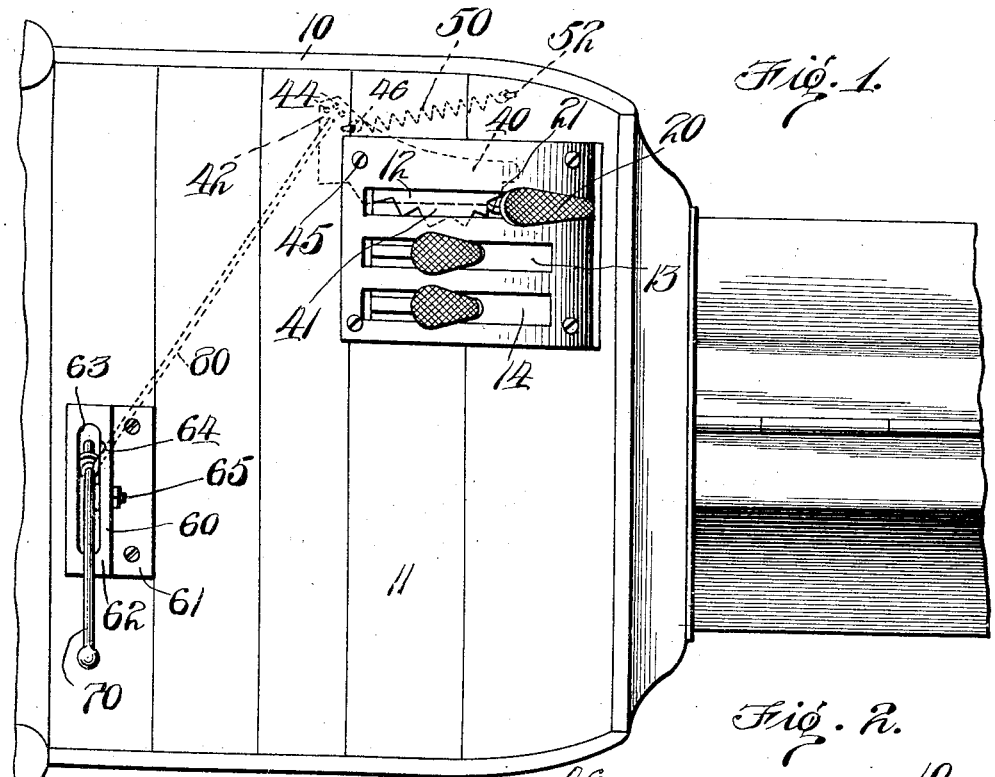
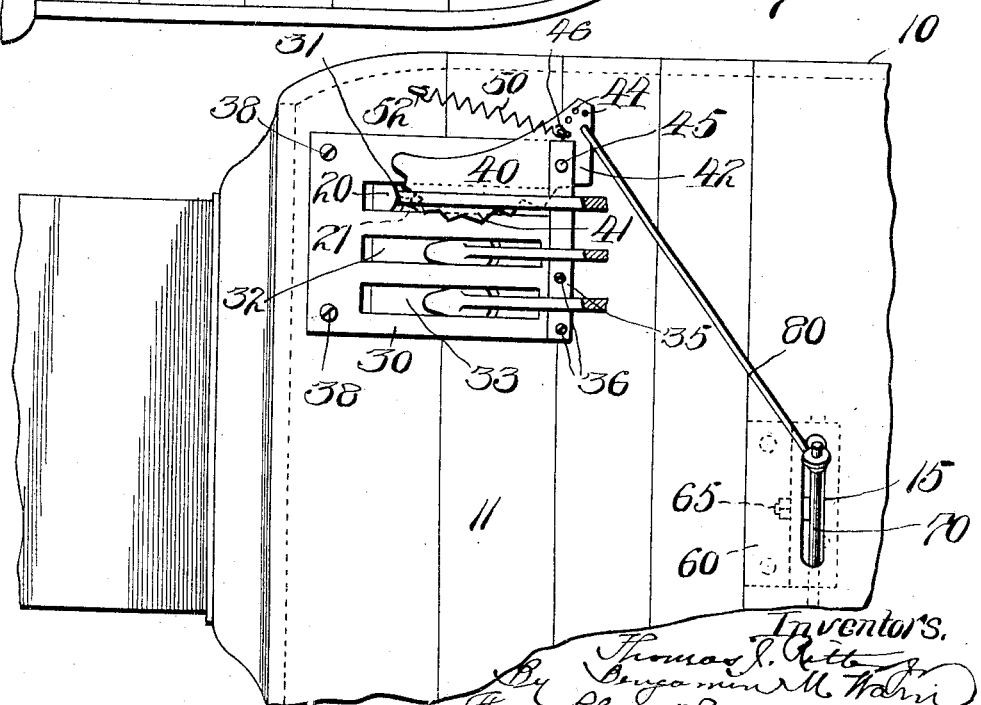

T. J. RITTER, Jr., AND B. M. WARN.
LEVER HOLDING MECHANISM FOR AUTOMOBILES.
APPLICATION FILED AUG. 6, 1919.
1,329,142.
Patented Jan. 27, 1920.
2 SHEETS—SHEET 2.
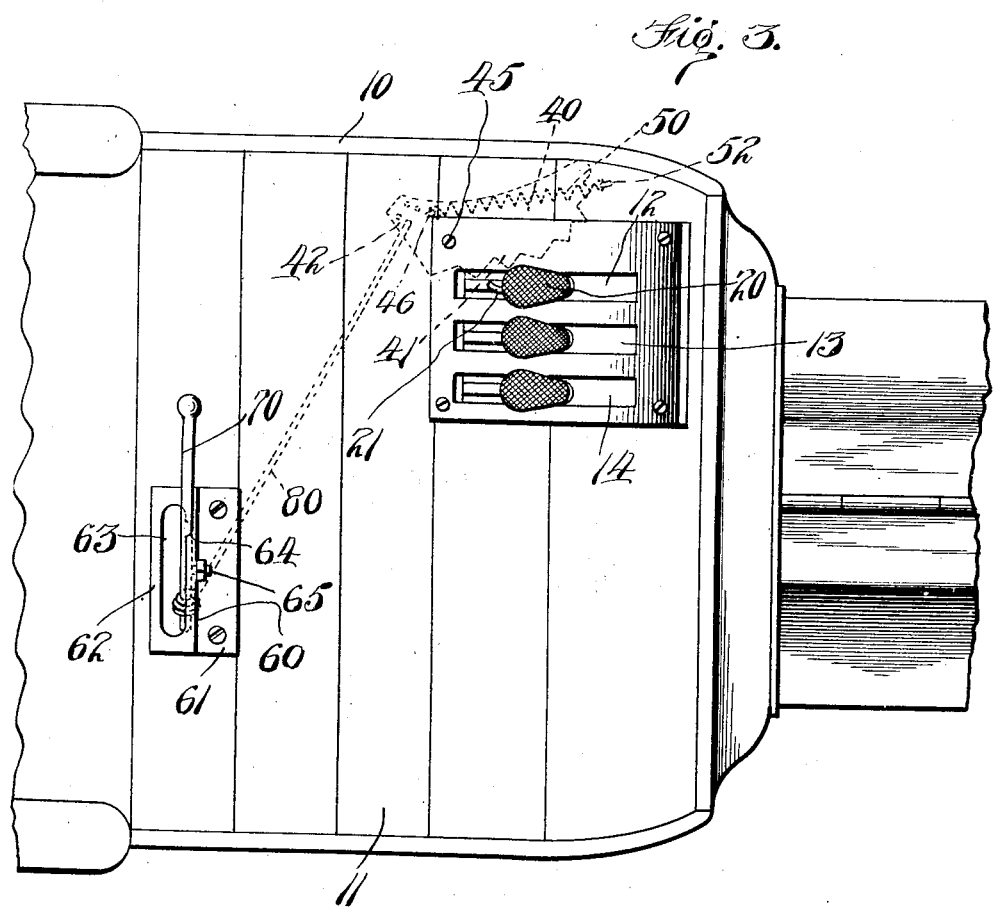
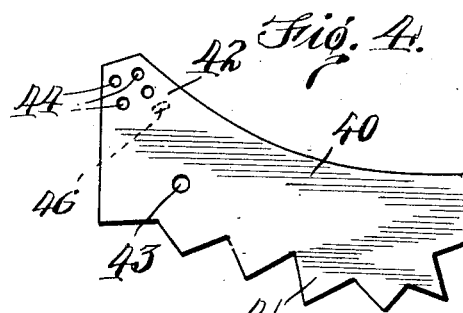

UNITED STATES PATENT OFFICE.

THOMAS J. RITTER, JR., AND BENJAMIN M. WARN, OF LAIRDSVILLE, PENNSYLVANIA.

LEVER-HOLDING MECHANISM FOR AUTOMOBILES.

1,329,142.  Specification of Letters Patent.  Patented Jan. 27, 1920.

Application filed August 6, 1919. Serial No. 315,610.

*To all whom it may concern:*

Be it known that we, THOMAS J. RITTER, Jr., and BENJAMIN M. WARN, citizens of the United States of America, and residents of Lairdsville, in the county of Lycoming, in the State of Pennsylvania, have invented certain new and useful Improvements in Lever-Holding Mechanism for Automobiles, whereof the following is a specification.

In certain automobiles, especially of the Ford type, the speed is regulated by the position of a power or clutch lever operated by the foot to forward position for low gear and by a spring to backward position for high gear, and in the position of slow speed for hill climbing a constant pressure is required to maintain the lever at low gear. This results in strain and weariness to the driver where hilly or bad roads are traveled.

This invention relates to a power lever holding mechanism for automobiles, which is shiftable into operative or inoperative position, and which acts automatically when in operative position to hold the power lever in the desired fixed position, and when shifted to inoperative position becomes totally disengaged from said lever, whereby the latter may be operated in the usual way for any period of time without frequent adjustment of the holding mechanism.

Figure 1 of the accompanying drawings represents a top plan view of the front portion of the body of an automobile of the Ford type, showing the preferred embodiment of this invention, the parts thereof being in operative relation to the lever holding it at low gear.

Fig. 2 represents a plan view of the underside thereof.

Fig. 3 represents a top plan view showing the lever holding mechanism switched out of connection with the lever and locked in inoperative position.

Fig. 4 represents a detailed plan of the swinging toothed segment constituting a part of this device.

The same reference numbers indicate corresponding parts in all the figures, the principal parts being designated by round numbers and the subordinate features thereof by intermediate numbers.

In the illustrated embodiment of the invention certain features of the usual construction of a Ford car are shown; namely, a body 10 provided with a foot or floor board 11 having a series of slots 12, 13 and 14 disposed side by side for the different pedal levers for controlling the car. A foot lever 20 which controls the clutch for shifting from neutral to high or low gear and the reverse is shown as usual in the left hand slot 12 and is movable from neutral into high or low gear position in the usual manner.

In the application of this invention in its preferred form of embodiment to the particular type of automobile above referred to, there is added to the well known elements above cited a slotted metallic plate 30 disposed underneath and secured to the bottom board 11. This plate is provided with slots 31, 32 and 33 corresponding with the slots aforesaid in said parts 11. This plate has near its lower left hand corner a stud or bolt hole. A strip 35, preferably of metal, underlies the plate 30 at the rear edge thereof and is secured to the underside of the bottom or floor board by means of screws 36 or other fastenings. It is also provided with a bolt hole 34 which registers with the bolt hole 34 of the plate 30. The body of said plate 30 is also secured near its opposite edges by screws 38 or other fastenings to said bottom board 11.

An oscillating locking plate 40 is pivoted between its ends and comprises a convex toothed segment 41 having a series of ratchet teeth and a shank 42 extending in opposite directions from its pivot, which is in the form of a bolt or stud 45 passed through the hole 43 in said plate and through the bolt holes aforesaid in the slotted plate 30 and strip 35. In the form illustrated the shank 42 is on the outer side of the pivot and the toothed segment on the inner side thereof. The shank 42 is preferably provided with a series of holes 44 and with an eye 46.

A contractile spring 50 is connected at one end to an eye 46 in the shank of said oscillating locking plate on the outer side of the pivot of said plate and at the other end to an eye 52 secured to the bottom board at the left of said plate. This spring tends constantly to pull the shank portion of said locking plate toward the left outward and the toothed segment thereof which is on the inner side of the pivot of said plate, toward the right, constantly maintaining the teeth of said segment in operative conjunction with the slot 12 in which the clutch lever 20 moves. The locking plate is thus constantly held in yielding contact with the lever 20 in position to automatically engage said lever by its several teeth and to hold said lever in the different positions into which it is pushed by the foot after the foot is withdrawn therefrom. The lever 20 is preferably provided with a catch rib or plate 21, preferably arc-shaped in cross section, which facilitates the engagement therewith of the toothed segment 41.

The convex toothed segment with its series of ratchet teeth is adapted to hold the power lever 20 under the tension of its spring in neutral as well as in forward position and the series of teeth disposed on a convex curve adapt it to the different swings of the power lever. The laterally curved or inclined catch rib 21 coöperates effectively with said teeth to hold the power lever in adjusted position.

Means are provided for disengaging the oscillating locking plate 40 from the lever 20 and also means for locking the lever holding mechanism totally out of connection with the power controlling lever when desired. The means shown for this purpose are manually actuated and comprise a spring bracket 60, a hand lever 70 pivoted thereto and a rod 80 connected at one end to the lower end of said lever and at the other end with one of the holes 44 in the shank of said oscillating locking plate 40, a number of such holes being provided to facilitate the proper adjustment of said rod to give the proper swing to said plate. The spring bracket 60 is constructed of sheet metal and is provided with a bottom attaching flange 61 and a top flange 62. This bracket is secured to a floor board of the body 10 by screws passing through the bottom flange 61 into said floor board. The top flange 62 has a slot 63 and a notch 64 at the left hand of said slot. The body of the spring bracket is provided with a stud 65. A hand lever 70 is fulcrumed on said stud and extends upward therefrom and plays as regards its upper portion in said slot 63, the lower portion of this lever projects downward through slot 15 in a floor board of the body 10. The rod 80 is connected at its inner end with the lower end of said lever and at its outer end with the eye 44 in the shank of the locking plate 40. The attaching flange 61 is slightly beveled from the right angled position with respect to the upright body of the bracket whereby a spring action is imparted to said bracket with respect to the lever 70, the bracket tending to press against said lever on the side in which the notch 64 is located so that as said lever is swung to the extreme left, said bracket springs backward and causes the notch 64 to engage and hold said lever in such adjusted position. The engagement of the spring plate with the lever permits the swinging of said lever under slight manual pressure.

The devices constituting this lever holding mechanism are very simple and may be applied to an automobile already in use without the aid of a skilled mechanic.

In the use of this invention the lever holding mechanism is placed in operative position as shown in Fig. 1 by swinging the hand lever 70 toward the right. The oscillating locking plate 40 is then subject to the tension of the spring 50 and its toothed segmental portion 41 is constantly held in touch with the clutch or speed lever 20. When this lever is pushed forward to throw the clutch on low gear, the teeth of the segment slide behind said lever one after the other and when said lever reaches the desired forward position, the operator withdraws his foot therefrom and the tooth which is directly behind said lever locks it in stationary position. The operator is thus relieved of the constant foot and leg strain incident to the maintaining of low gear in the usual way. When it is desired to shift the lever to neutral or high gear position, the hand lever 70 is swung toward the left and the oscillating plate 40 is disengaged from the lever 20.

When it is desired to totally disconnect the lever holding mechanism from the driving mechanism of the car, the hand lever 70 is swung toward the left to a point opposite, the notch 64 and the spring action of the bracket 60 engages said hand lever and then the automobile may be operated in the same manner as if no lever holding mechanism were mounted thereon.

The details of the mechanism herein described may be varied without a departure from the spirit or scope of the invention.

We claim as our invention:

1. The combination of a floor plate having a slot, an automobile speed control lever playing in said slot, an oscillating locking plate pivoted adjacent to the rear end of said slot and provided with a shank extending outward and rearward on one side of its pivot and a convex segment projecting inward and forward on the other side of said pivot, said convex segment having a series of teeth on its arc-shaped edge adapted to engage said lever in neutral and forward positions, a spring connected with said shank and adapted to yieldingly hold said toothed segment opposite said slot, and means mounted independently of said locking plate for shifting it out of engagement with said lever.

2. The combination with a pedal lever of an automobile provided with rearwardly projecting engaging plate, of an oscillating locking plate having a toothed segment adapted to lock behind said engaging plate, means for yieldingly holding said oscillating plate with its toothed segment in such engagement, a notched spring bracket, a lever engaged by said spring bracket, and a rod connecting said lever with said oscillating locking plate.

THOMAS J. RITTER, Jr.
BENJAMIN M. WARN.